W. H. CLAY.
TIRE FOR AUTOMOBILES.
APPLICATION FILED MAY 12, 1915.

1,168,709.

Patented Jan. 18, 1916.

Inventor
W. H. Clay.

UNITED STATES PATENT OFFICE.

WILLIAM H. CLAY, OF CAMEO, COLORADO.

TIRE FOR AUTOMOBILES.

1,168,709.   Specification of Letters Patent.   Patented Jan. 18, 1916.

Application filed May 12, 1915. Serial No. 27,577.

*To all whom it may concern:*

Be it known that I, WILLIAM H. CLAY, a citizen of the United States, residing at Cameo, in the county of Mesa and State of Colorado, have invented certain new and useful Improvements in Tires for Automobiles; and I do hereby declare the following to be a full, clear, and exact description of the invention, such as will enable others skilled in the art to which it appertains to make and use the same.

The invention relates to improvements in tires for automobiles and other motor vehicles.

The object of the present invention is to improve the construction of tires for automobiles and the like and to provide a simple, practical, and comparatively inexpensive tire equipped with means for rendering a pneumatic tire puncture proof and provided with an elastic armor section adapted to deflect nails and similar articles to prevent the same from reaching the inner tube and capable also of affording an elastic tread to prevent the armor from affecting the resiliency and cushioning action of the tire.

With these and other objects in view the invention consists in the construction and novel combination and arrangement of parts hereinafter fully described, illustrated in the accompanying drawings and pointed out in the claim hereto appended, it being understood that various changes in the form, proportion and minor details of construction may be resorted to without departing from the spirit or sacrificing any of the advantages of the invention.

Figure 1:
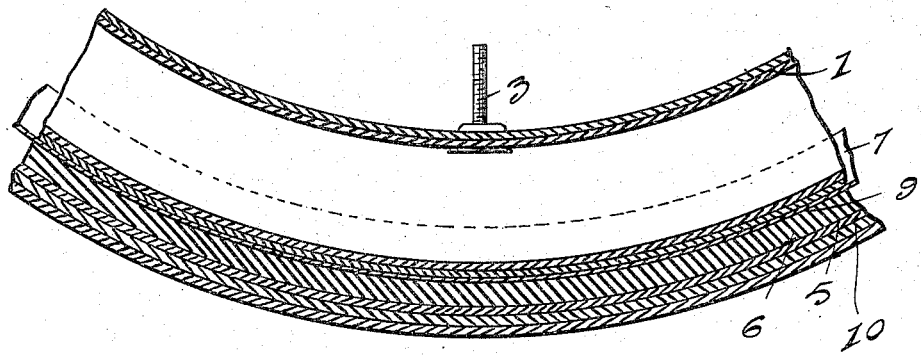
Figure 2:
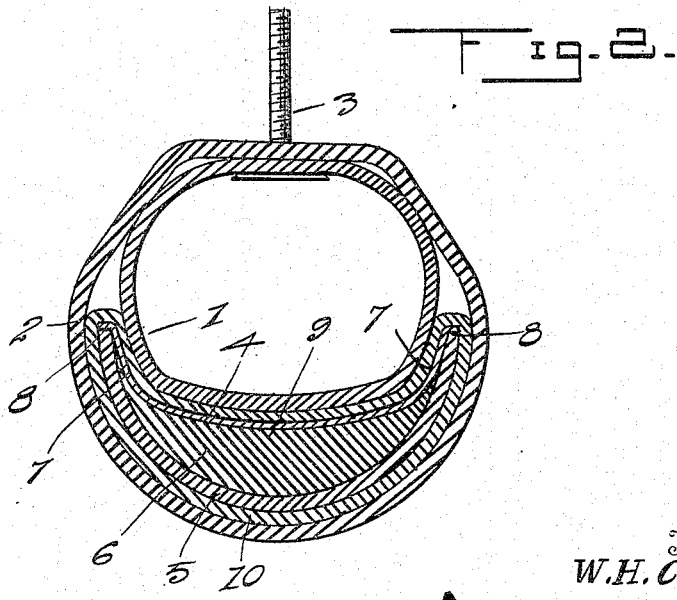

In the drawing Figure 1 is a longitudinal sectional view of a portion of a tire constructed in accordance with this invention, Fig. 2 is a transverse sectional view of the same.

Like numerals of reference designate corresponding parts in the several figures of the drawing.

In the accompanying drawing in which is illustrated the preferred embodiment of the invention, 1 and 2 designate inner and outer tubes of a pneumatic tire, the inner tube being provided with a suitable valve 3 of the ordinary construction for enabling it to be inflated. The outer tube 2 is shown continuous as the means hereinafter described for protecting the inner tube will obviate the necessity of removing and repairing the same, but the outer tube may be constructed of any other desired type, such as a clencher tire if desired.

The means for protecting the inner tube comprises a circumferentially arranged tire unit consisting of a metallic ring or band 4, a circumferentially arranged approximately semi-tubular layer 5 of rubber or other suitable material such as a combination of rubber and fabric and an interposed filler section 6 located between the metallic ring or band and the elastic flexible layer 5. The circumferential strip which may be either continuous or in sections is constructed of suitable resilient sheet metal or other suitable material and it is composed of a transversely straight intermediate portion, curved outwardly extending side portions 7 and laterally projecting flanges 8 which constitute supporting ledges for the circumferential edges of the elastic layer 5. The circumferential filler section 6 which imparts elasticity to the tire unit is constructed of any suitable material and it presents a curved outer face to the layer 5 and its inner face conforms to the configuration of the elastic strip or band and is recessed as shown at 9 to receive the same. The circumferential layer of elastic material 5 is maintained on the laterally projecting flanges 8 of the metallic strip or band by a covering 10 of fabric or other flexible material which extends around the outer face of the layer 5 and the inner face of the strip or band 4.

The metallic strip or band is adapted to prevent a nail, pin, or similar article from piercing the outer portion of the tire in puncturing the inner tube, and the inclined side portions of the metallic strip or band are adapted to deflect a nail or similar instrument and cause the same to pass outwardly instead of inwardly. The tire protecting unit not only forms an armor for the inner tube but it increases the elasticity of a tire and enables the same to respond to the cushioning action of the inner tube. It is adapted to increase the life and durability of pneumatic tires and may be readily applied to the same as a separate unit to be interposed between the inner tube and the outer tube.

What is claimed is:—

A tire of the class described including an inflatable inner tube and a protecting unit comprising a metallic strip or band extending circumferentially around the tire and having inclined side portions provided with laterally projecting flanges forming supporting ledges, a circumferentially arranged layer of approximately semi-tubular form supported at its side edges upon the said ledges, an elastic cushioning section interposed between the metallic strip or band and the said layer and a covering for the said unit retaining the layer on the said ledges.

In testimony whereof I affix my signature in presence of two witnesses.

WILLIAM H. CLAY.

Witnesses:
JOHN W. DAVIS,
FRANK A. WACHOB.

Copies of this patent may be obtained for five cents each, by addressing the "Commissioner of Patents, Washington, D. C."